US012338113B2

(12) United States Patent
Anderson

(10) Patent No.: US 12,338,113 B2
(45) Date of Patent: Jun. 24, 2025

(54) VENTED FUNNEL ASSEMBLY

(71) Applicant: Jesse Anderson, Groton, SD (US)

(72) Inventor: Jesse Anderson, Groton, SD (US)

( * ) Notice: Subject to any disclaimer, the term of this patent is extended or adjusted under 35 U.S.C. 154(b) by 183 days.

(21) Appl. No.: 18/118,585

(22) Filed: Mar. 7, 2023

(65) Prior Publication Data

US 2024/0300798 A1 Sep. 12, 2024

(51) Int. Cl.
*B67C 11/00* (2006.01)
*B67C 11/02* (2006.01)

(52) U.S. Cl.
CPC ........... *B67C 11/02* (2013.01); *B67C 2011/30* (2013.01)

(58) Field of Classification Search
CPC ............................ B67C 11/02; B67C 2011/30
See application file for complete search history.

(56) References Cited

U.S. PATENT DOCUMENTS

| | | | | | | |
|---|---|---|---|---|---|---|
| 94,742 | A | * | 9/1869 | Hildebrand | B67C 11/02 | 141/310 |
| 140,350 | A | * | 7/1873 | Growther | B67C 11/02 | 141/299 |
| 279,739 | A | * | 6/1883 | Gifford | B67C 11/02 | 141/299 |
| 1,355,952 | A | * | 10/1920 | Even | B67C 11/02 | 141/300 |
| 1,676,986 | A | * | 7/1928 | Hilford | B67C 11/02 | 141/340 |
| 1,705,312 | A | * | 3/1929 | Rovano | B67C 11/02 | 141/297 |
| 1,727,195 | A | * | 9/1929 | Black | B67C 11/02 | D7/700 |
| 3,177,907 | A | * | 4/1965 | Baldi | B67C 11/04 | 141/344 |
| 3,973,602 | A | * | 8/1976 | Kruse | B67C 11/02 | 141/297 |
| 4,202,386 | A | * | 5/1980 | Orr | B67C 11/00 | 141/95 |
| 4,494,585 | A | * | 1/1985 | Waldecker | B67C 11/00 | 141/297 |
| 4,850,403 | A | * | 7/1989 | Wiese | B67C 11/02 | 141/331 |
| 5,277,234 | A | * | 1/1994 | Warstler | B67C 11/04 | 141/345 |
| 5,458,168 | A | | 10/1995 | Lindgren | | |
| 5,787,944 | A | * | 8/1998 | Sarkis | B67C 11/02 | 141/331 |
| 5,792,356 | A | * | 8/1998 | Yuan | B01D 29/085 | 210/473 |
| 6,119,739 | A | * | 9/2000 | McGee | B65B 39/04 | 141/300 |

(Continued)

FOREIGN PATENT DOCUMENTS

CA 2624572 9/2009

*Primary Examiner* — Frederick C Nicolas

(57) ABSTRACT

A vented funnel assembly for venting a receptacle while liquid is poured into the receptacle includes a first funnel that is insertable into a neck of a receptacle. A second funnel is nested in the first funnel and a liquid can be poured into the second funnel when the first funnel is inserted into the neck of the receptacle. The second funnel is separated from the first funnel to define an air passage between the first funnel and the second funnel. In this way the air passage can ventilate air within the receptacle when the liquid is poured into the second funnel.

3 Claims, 6 Drawing Sheets

(56) References Cited

U.S. PATENT DOCUMENTS

| | | | | | |
|---|---|---|---|---|---|
| 6,142,193 | A * | 11/2000 | Sanders | B67C 11/02 141/331 |
| 6,408,693 | B1 * | 6/2002 | Drinkwater | G01F 23/02 141/95 |
| 7,017,628 | B2 | 3/2006 | Najafi | |
| 7,757,728 | B2 | 7/2010 | Gruber | |
| 8,567,456 | B1 * | 10/2013 | Francis | B67C 11/02 141/340 |
| D783,209 | S | 4/2017 | Morris | |
| 10,246,316 | B1 * | 4/2019 | Winters | B67C 11/02 |
| 10,647,564 | B2 | 5/2020 | Showalter | |
| 11,548,773 | B1 * | 1/2023 | Flowers | B67C 11/02 |
| 11,691,863 | B2 * | 7/2023 | Theofilos | B67C 11/04 141/331 |
| 11,745,994 | B2 * | 9/2023 | Marcink | B67C 11/02 141/331 |

* cited by examiner

VENTED FUNNEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to funnel devices and more particularly pertains to a new funnel device for venting a receptacle while liquid is poured into the receptacle. The device includes a first funnel and a second funnel nested in the first funnel. The second funnel is spaced from the first funnel to define an air passage between the first funnel and the second funnel. In this way the air passage can ventilate air from the receptacle while the liquid is being poured into the receptacle.

(2) Description of Related Art Including Information Disclosed Under 37 CFR 1.97 and 1.98

The prior art relates to funnel devices including a variety of self closing funnel devices that each at least includes a spring loaded plunger. The prior art discloses a sealed funnel for transferring solvents without atmospheric contamination. The prior art discloses an adapter that includes a female coupling for establishing a friction seal with a male coupling to insert or extract fluid from a container.

BRIEF SUMMARY OF THE INVENTION

An embodiment of the disclosure meets the needs presented above by generally comprising a first funnel that is insertable into a neck of a receptacle. A second funnel is nested in the first funnel and a liquid can be poured into the second funnel when the first funnel is inserted into the neck of the receptacle. The second funnel is separated from the first funnel to define an air passage between the first funnel and the second funnel. In this way the air passage can ventilate air within the receptacle when the liquid is poured into the second funnel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
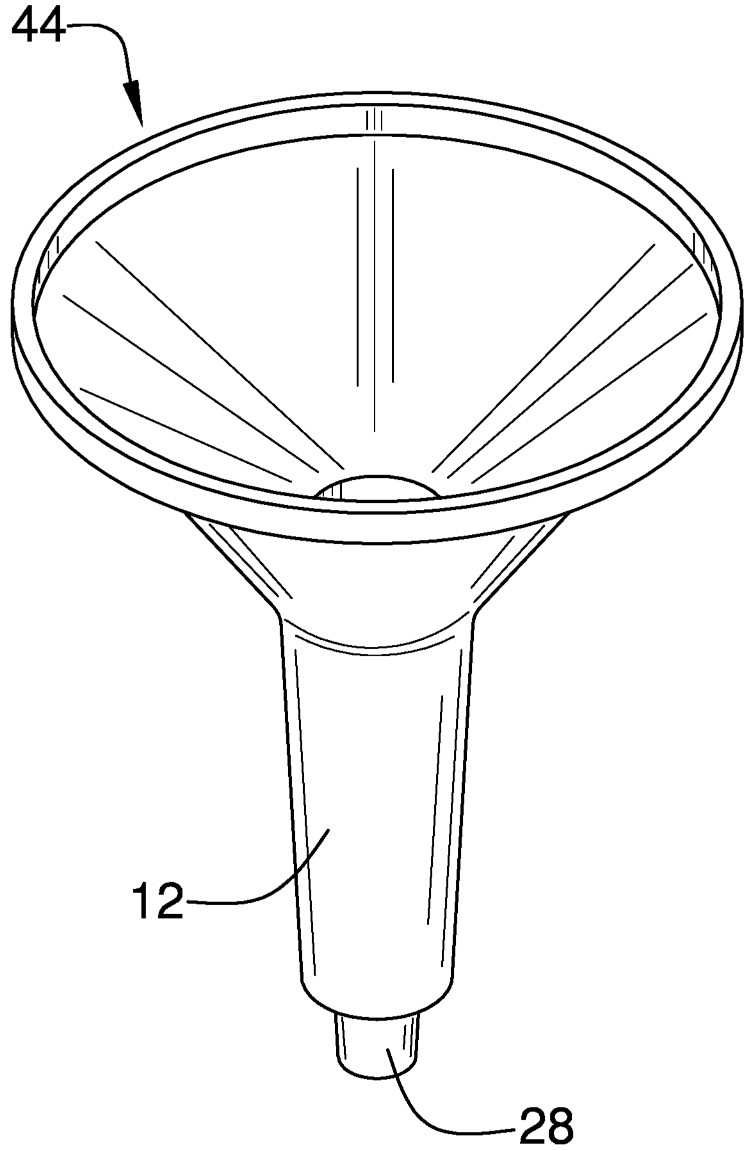
FIG. 1 is a top perspective view of a vented funnel assembly according to an embodiment of the disclosure.
Figure 2:
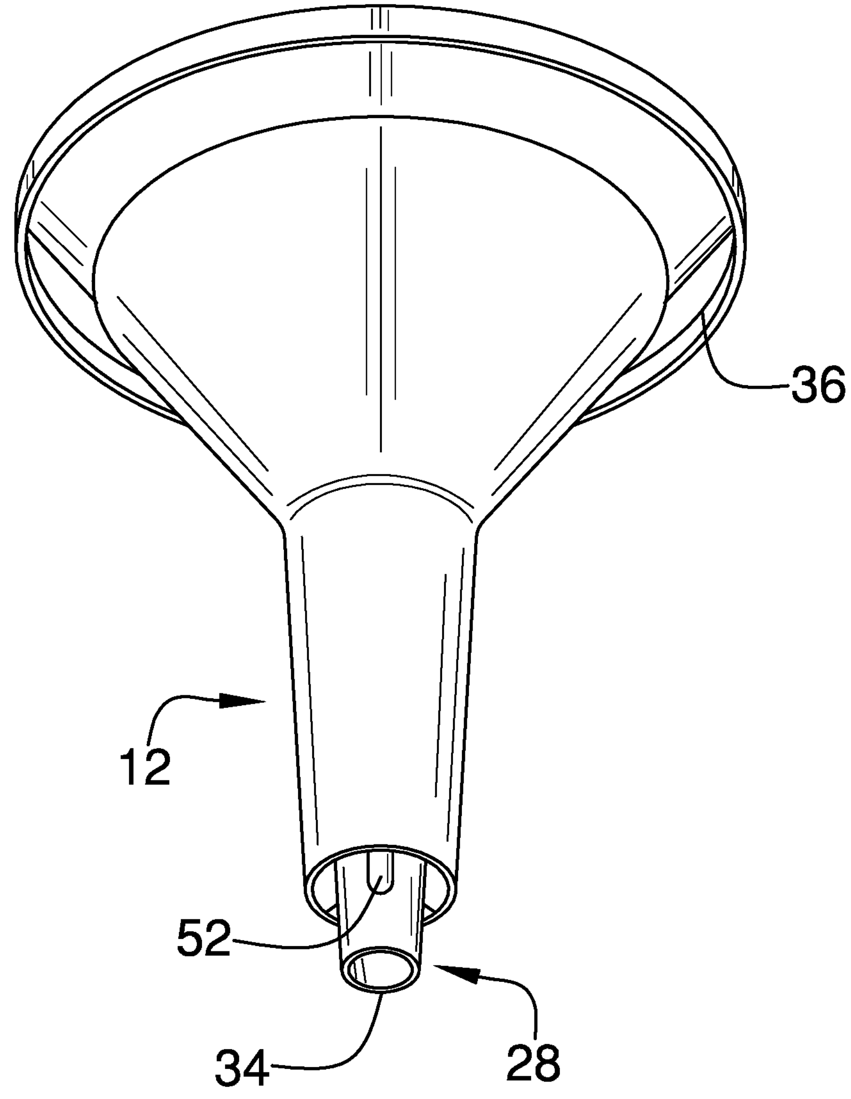
FIG. 2 is a bottom perspective view of an embodiment of the disclosure.
Figure 3:
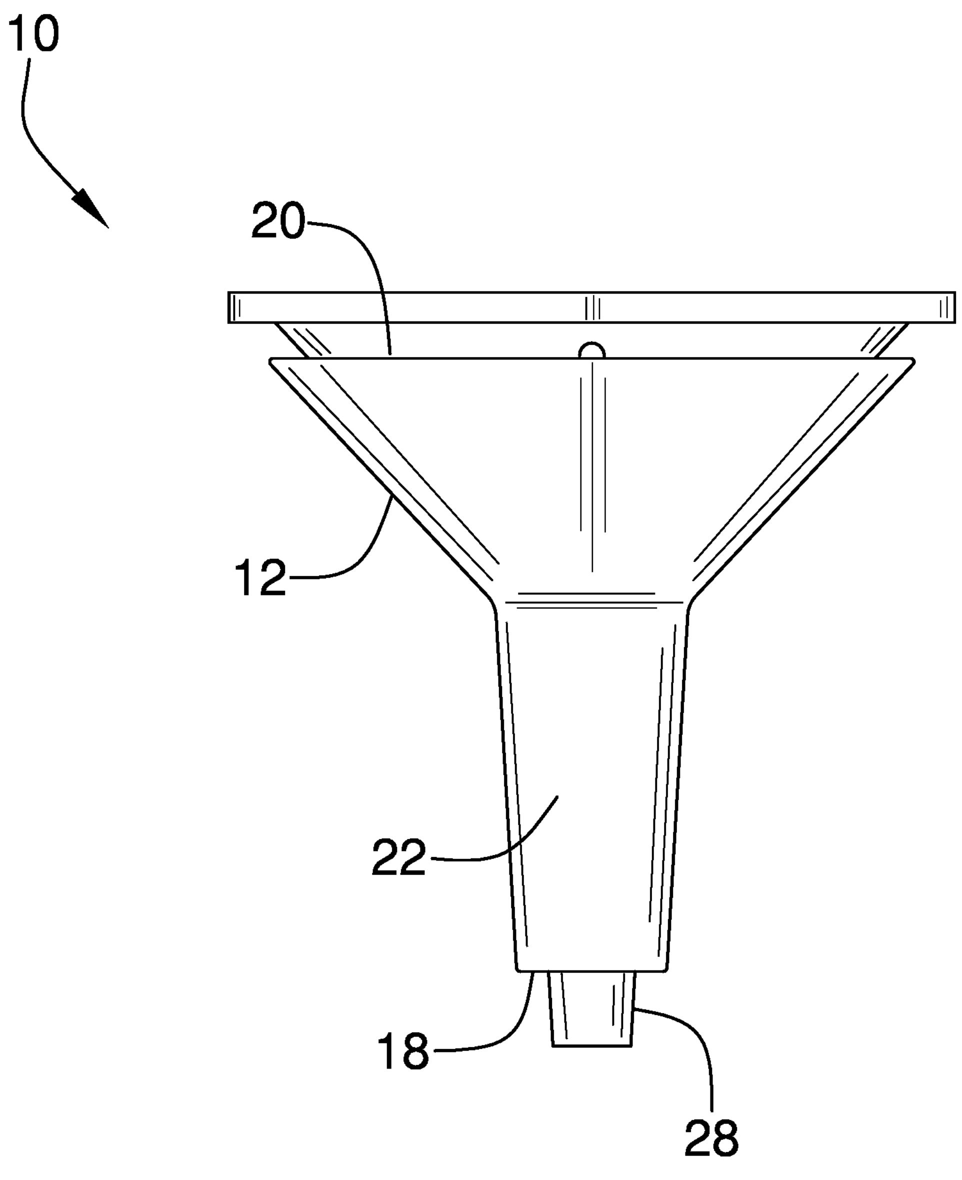
FIG. 3 is a front view of an embodiment of the disclosure.
Figure 4:
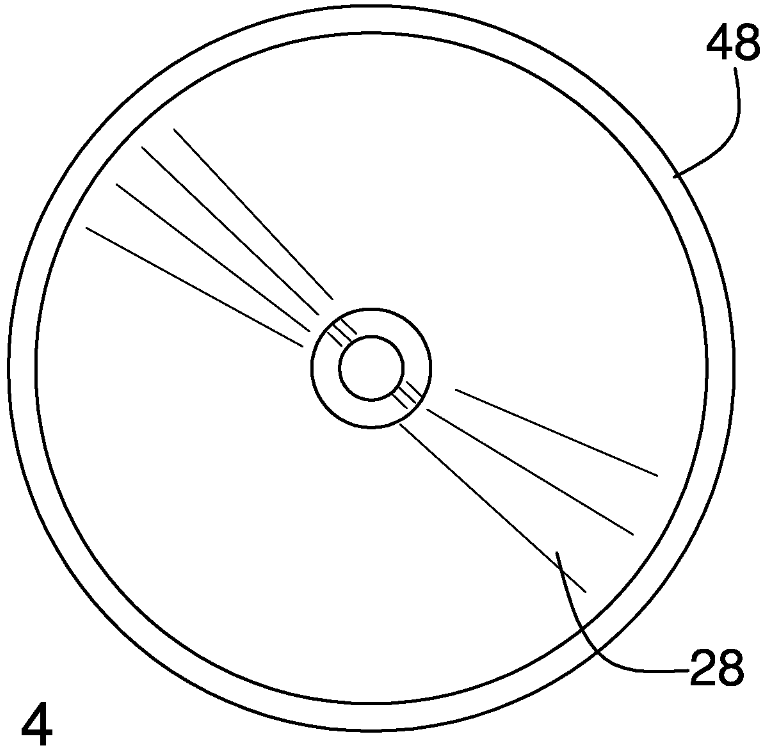
FIG. 4 is a top view of an embodiment of the disclosure.
Figure 5:
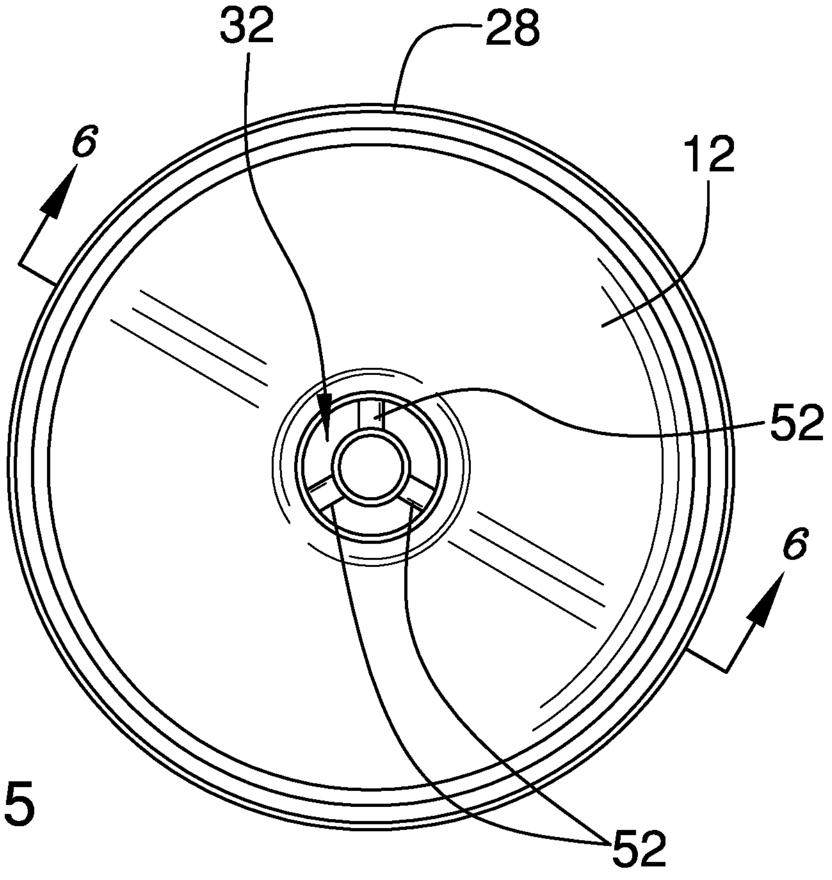
FIG. 5 is a bottom view of an embodiment of the disclosure.
Figure 6:
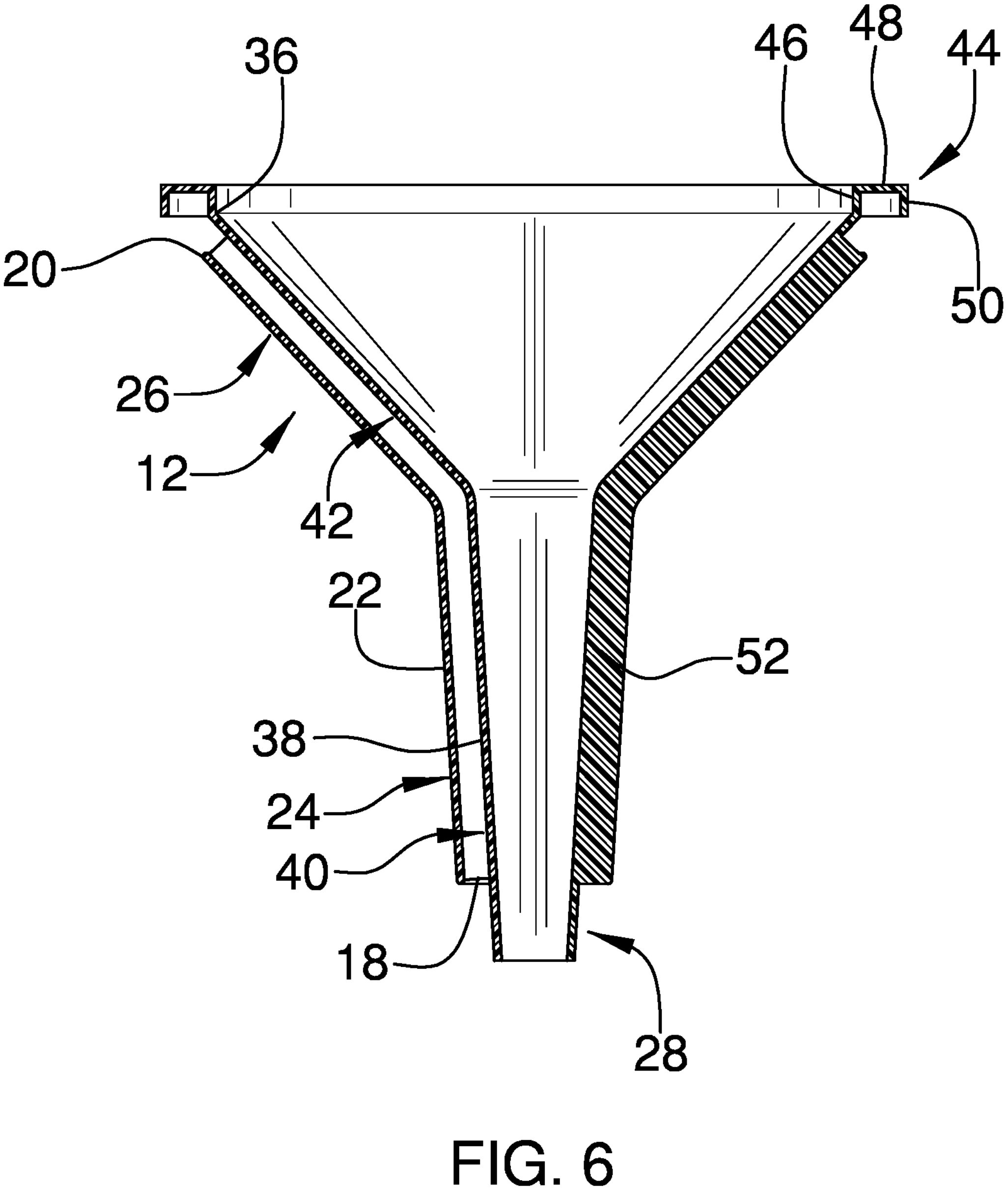
FIG. 6 is a cross sectional view taken along line 6-6 of FIG. 5 of an embodiment of the disclosure.
Figure 7:
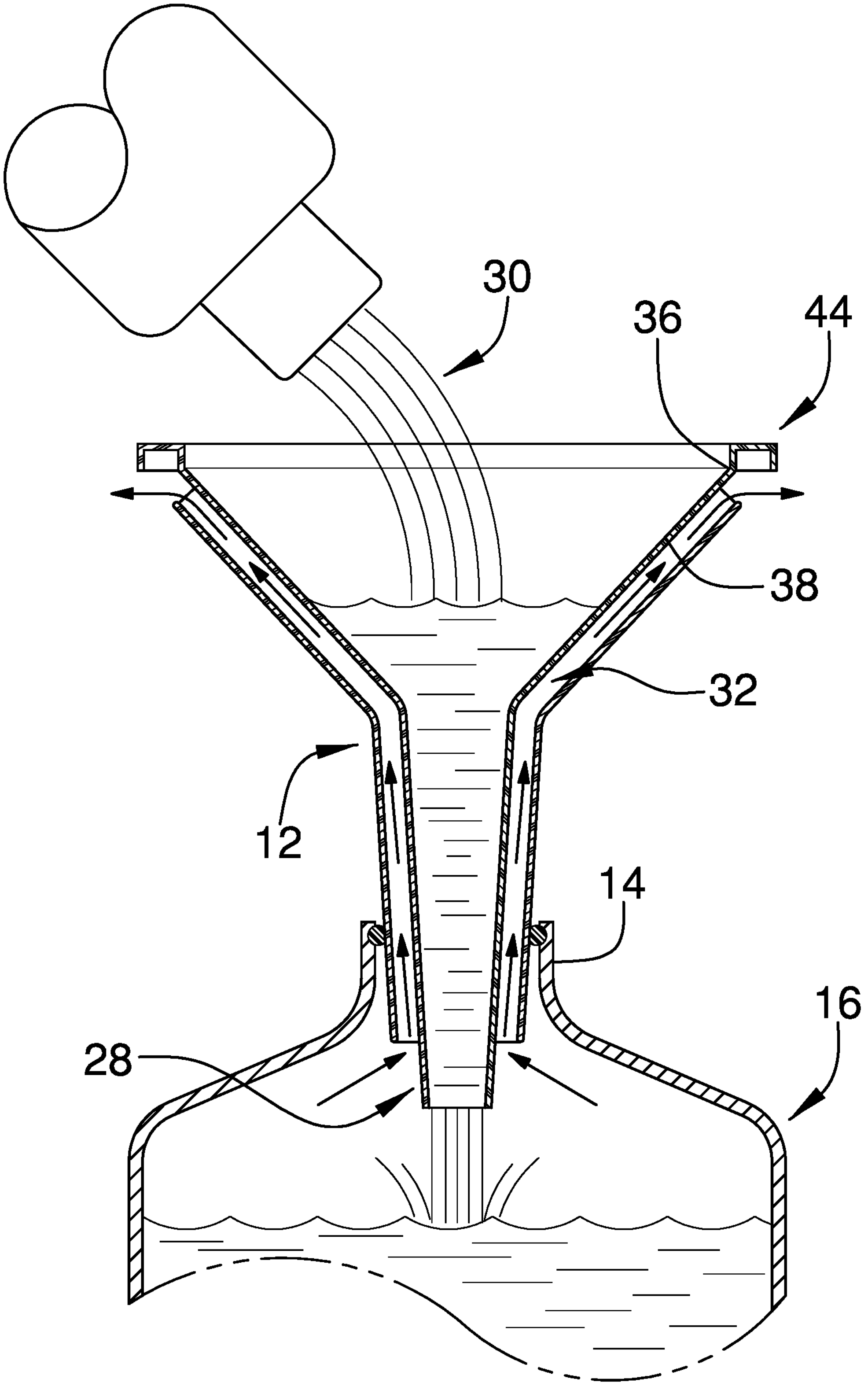
FIG. 7 is a cut-away in-use view of an embodiment of the disclosure.

With reference now to the drawings, and in particular to FIGS. 1 through 7 thereof, a new funnel device embodying the principles and concepts of an embodiment of the disclosure and generally designated by the reference numeral 10 will be described.

As best illustrated in FIGS. 1 through 7, the vented funnel assembly 10 generally comprises a first funnel 12 that is insertable into a neck 14 of a receptacle 16. The first funnel 12 has a lower end 18, an upper end 20 and an outer wall 22 extending between the lower end 18 and the upper end 20. The outer wall 22 has a lower portion 24 extending from the lower end 18 toward the upper end 20 and the outer wall 22 has an upper portion 26 extending between the lower portion 24 and the upper end 20. The lower portion 24 is tapered between the upper portion 26 and the lower end 18 and the upper portion 26 flares outwardly between the lower portion 24 and the upper end 20.

A second funnel 28 is nested in the first funnel 12 to facilitate a liquid 30 to be poured into the second funnel 28 when the first funnel 12 is inserted into the neck 14 of the receptacle 16. The receptacle 16 may be a bottle, a liquid 30 reservoir or any other type of liquid container and the liquid 30 may be any type of liquid that can be poured into the receptacle 16. The second funnel 28 is separated from the first funnel 12 to define an air passage 32 between the first funnel 12 and the second funnel 28. In this way the air passage 32 ventilates air within the receptacle 16 when the liquid 30 is poured into the second funnel 28.

The second funnel 28 has a bottom end 34, a top end 36 and an outside wall 38 extending between the bottom end 34 and the top end 36. The outside wall 38 has a bottom portion 40 extending from the bottom end 34 toward the top end 36 and the outside wall 38 has a top portion 42 extending between the bottom portion 40 and the top end 36. The bottom portion 40 tapers between the top portion 42 and the bottom end 34 and the top portion 42 flares outwardly between the bottom portion 40 and the top end 36. The bottom portion 40 has a length that is greater than a length of the lower portion 24 of the outer wall 22 of the first funnel 12 such that the bottom end 34 is spaced downwardly from the lower end 18 of the first funnel 12. Furthermore, the top portion 42 has a length that is greater than a length of the upper portion 26 of the outer wall 22 of the first funnel 12 such that the top end 36 is spaced upwardly from the upper end 20 of the second funnel 28.

The outside wall 38 has a lip portion 44 which has a first vertical wall 46 extending upwardly from the top end 36. The lip portion 44 includes a horizontal wall 48 which extends laterally away from the first vertical wall 46 at a perpendicular angle. Additionally, the lip portion 44 has a second vertical wall 50 extending downwardly from the horizontal wall 48 at a perpendicular angle. The horizontal wall 48 is positioned over the upper end 20 of the first funnel 12 to inhibit the liquid 30 from spilling into the air passage 32.

A plurality of partitions 52 is included and each of the partitions 52 extends between the outer wall 22 of the first funnel 12 and the outside wall 38 of the second funnel 28. In this way the partitions 52 retain the spacing between the first funnel 12 and the second funnel 28. Each of the partitions 52 extends between the lower end 18 and the upper end 20 of the first funnel 12. Furthermore, the partitions 52 are spaced apart from each other and are evenly distributed around the outside wall 38 of the second funnel 28.

In use, the bottom end 34 of the first funnel 12 is inserted into the neck 14 of the receptacle 16 and the liquid 30 is poured into the second funnel 28. In this way the receptacle 16 can be filled with the liquid 30 without spilling the liquid 30. Furthermore, the air passage 32 facilitates air to be ventilated from the receptacle 16 as the liquid 30 is poured into the receptacle 16. In this way air pressure does not build within the receptacle 16 that can subsequently cause air bubbles to rise through the second funnel 28 while the liquid 30 is being poured into the second funnel 28. Additionally, the lip portion 44 of the outside wall 38 of the second funnel 28 inhibits the liquid 30 from spilling into the air passage 32 while the liquid 30 is being poured into the second funnel 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vented funnel assembly for facilitating air to be vented from a receptacle into which a liquid is being poured, said assembly comprising:

a first funnel being insertable into a neck of a receptacle;

a second funnel being nested in said first funnel wherein said second funnel is configured to have a liquid poured into said second funnel when said first funnel is inserted into said neck of said receptacle, said second funnel being separated from said first funnel to define an air passage between said first funnel and said second funnel wherein said air passage is configured to ventilate air within said receptacle when the liquid is poured into said second funnel;

wherein said first funnel has a lower end, an upper end and an outer wall extending between said lower end and said upper end, said outer wall having a lower portion extending from said lower end toward said upper end, said outer wall having an upper portion extending between said lower portion and said upper end, said lower portion being tapered between said upper portion and said lower end, said upper portion flaring outwardly between said lower portion and said upper end;

wherein said second funnel has a bottom end, a top end and an outside wall extending between said bottom end and said top end, said outside wall having a bottom portion extending from said bottom end toward said top end, said outside wall having a top portion extending between said bottom portion and said top end, said bottom portion tapering between said top portion and said bottom end, said top portion flaring outwardly between said bottom portion and said top end;

wherein said bottom portion has a length that is greater than a length of said lower portion of said outer wall of said first funnel such that said bottom end is spaced downwardly from said lower end of said first funnel;

wherein said top portion has a length that is greater than a length of said upper portion of said outer wall of said first funnel such that said top end is spaced upwardly from said upper end of said second funnel; and wherein said outside wall has a lip portion which has a first vertical wall extending upwardly from said top end and a horizontal wall extending laterally away from said first vertical wall at a perpendicular angle and a second vertical wall extending downwardly from said horizontal wall at a perpendicular angle, said horizontal wall being positioned over said upper end of said first funnel wherein said lip portion is configured to inhibit the fluid from spilling into said air passage.

2. The assembly according to claim 1, further comprising a plurality of partitions, each of said partitions extending between said outer wall of said first funnel and said outside wall of said second funnel thereby retaining spacing between said first funnel and said second funnel, each of said partitions extending between said lower end and said upper end of said first funnel.

3. A vented funnel assembly for facilitating air to be vented from a receptacle into which a liquid is being poured, said assembly comprising:

a first funnel being insertable into a neck of a receptacle, said first funnel having a lower end, an upper end and an outer wall extending between said lower end and said upper end, said outer wall having a lower portion extending from said lower end toward said upper end, said outer wall having an upper portion extending between said lower portion and said upper end, said lower portion being tapered between said upper portion and said lower end, said upper portion flaring outwardly between said lower portion and said upper end;

a second funnel being nested in said first funnel wherein said second funnel is configured to have a liquid poured into said second funnel when said first funnel is inserted into said neck of said receptacle, said second funnel being separated from said first funnel to define an air passage between said first funnel and said second funnel wherein said air passage is configured to ventilate air within said receptacle when the liquid is poured into said second funnel, said second funnel having a bottom end, a top end and an outside wall extending between said bottom end and said top end, said outside wall having a bottom portion extending from said bottom end toward said top end, said outside wall having a top portion extending between said bottom portion and said top end, said bottom portion tapering between said top portion and said bottom end, said top portion flaring outwardly between said bottom portion and said top end, said bottom portion having a length being greater than a length of said lower portion of said outer wall of said first funnel such that said bottom end is spaced downwardly from said lower end of said first funnel, said top portion having a length being greater than a length of said upper portion of said outer wall of said first funnel such that said top end is spaced upwardly from said upper end of said second funnel, said outside wall having a lip portion which has a first vertical wall extending upwardly from said top end and a horizontal wall extending laterally away from said first vertical wall at a perpendicular angle and a second vertical wall extending downwardly from said horizontal wall at a perpendicular angle, said horizontal wall being positioned over said upper end of said first funnel wherein said lip portion is configured to inhibit the fluid from spilling into said air passage; and a plurality of partitions, each of said partitions extending between said outer wall of said first funnel and said outside wall of said second funnel thereby retaining spacing between said first funnel and said second funnel, each of said partitions extending between said lower end and said upper end of said first funnel, said partitions being spaced apart from each other and being evenly distributed around said outside wall of said second funnel.

* * * * *